(12) United States Patent
Wei et al.

(10) Patent No.: US 12,530,200 B2
(45) Date of Patent: Jan. 20, 2026

(54) SYSTEM AND METHOD FOR TRIGGERING A ZERO-CYCLE CONTEXT SWITCH

(71) Applicant: GREATER SHINE LIMITED, New Taipei (TW)

(72) Inventors: Jian Wei, San Diego, CA (US); Yanming Wang, San Diego, CA (US); Shiping Li, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 38 days.

(21) Appl. No.: 18/575,785

(22) PCT Filed: Sep. 8, 2021

(86) PCT No.: PCT/US2021/049405
§ 371 (c)(1),
(2) Date: Dec. 29, 2023

(87) PCT Pub. No.: WO2023/038618
PCT Pub. Date: Mar. 16, 2023

(65) Prior Publication Data
US 2024/0330037 A1 Oct. 3, 2024

(51) Int. Cl.
*G06F 9/38* (2018.01)
*G06F 9/48* (2006.01)

(52) U.S. Cl.
CPC .......... *G06F 9/3851* (2013.01); *G06F 9/4818* (2013.01)

(58) Field of Classification Search
CPC .... G06F 9/3851; G06F 9/4818; G06F 9/3863; G06F 9/30123
See application file for complete search history.

(56) References Cited

U.S. PATENT DOCUMENTS 7,567,248 B1\* 7/2009 Mark ...................... G06T 11/40
345/426
2001/0056456 A1 12/2001 Cota-Robles
(Continued)

OTHER PUBLICATIONS

Singh et al. "DARK: Designing A High Performance Micro-kernel for Power Electronics Controllers." In: 2002 CPES Conference, 2002 [online] [retrieved on Nov. 3, 2021 (Nov. 3, 2021)], entire document. 6 pages.

(Continued)

*Primary Examiner* — Farley Abad
(74) *Attorney, Agent, or Firm* — BAYES PLLC

(57) ABSTRACT

According to one aspect of the present disclosure, a processor is disclosed. The processor may include a plurality of registers. The plurality of registers may include a first set of registers associated with a regular mode thread. The plurality of registers may also include a second set of registers associated with an interrupt service thread. The processor may also include a processing core. The processing core may be configured to perform first operations associated with the regular mode thread. The processing core may be configured to receive an interrupt service signal associated with the interrupt service thread. In response to the interrupt service signal, the processing core may be configured to implement a zero-cycle context switch to perform second operations associated with the interrupt service thread using the second set of registers.

17 Claims, 5 Drawing Sheets

(56) References Cited

U.S. PATENT DOCUMENTS

| | | | |
|---|---|---|---|
| 2002/0038416 A1* | 3/2002 | Fotland | G06F 1/324 |
| | | | 712/228 |
| 2014/0082298 A1* | 3/2014 | Jungwirth | G06F 12/0846 |
| | | | 711/140 |
| 2015/0019847 A1 | 1/2015 | Catherwood | |

OTHER PUBLICATIONS

International Search Report in the international application No. PCT/US2021/049405, mailed on Dec. 7, 2021. 2 pages.
Written Opinion of the International Search Authority in the international application No. PCT/US2021/049405, mailed on Dec. 7, 2021. 6 pages.

* cited by examiner

SYSTEM AND METHOD FOR TRIGGERING A ZERO-CYCLE CONTEXT SWITCH

CROSS-REFERENCE TO RELATED APPLICATIONS

This application is a national stage application of International Application No. PCT/US2021/049405, filed on Sep. 8, 2021, which is incorporated herein by reference in its entirety.

BACKGROUND

Embodiments of the present disclosure relate to a system and method of implementing a zero-cycle context switch procedure.

In computing, a context switch is a process of storing the state of a thread that is in the middle of being run, so that it can be restored, and its execution can resume at a later time. This enables multiple threads to share a single processor, and is a feature of most multitasking operating systems. Context switches are often computationally intensive. Moreover, a context switch from one thread is often implemented across multiple clock cycles. During a context switch, a processor may pause an active thread, save register data in another memory or register file, generate memory maps associated with the paused thread, and updating various tables and lists, just to name a few, before running an interrupt service thread.

SUMMARY

According to one aspect of the present disclosure, a processor is disclosed. The processor may include a plurality of registers. The plurality of registers may include a first set of registers associated with a regular mode thread. The plurality of registers may also include a second set of registers associated with an interrupt service thread. The processor may also include a processing core. The processing core may be configured to perform first operations associated with the regular mode thread. The processing core may be configured to receive an interrupt service signal associated with the interrupt service thread. In response to the interrupt service signal, the processing core may be configured to implement a zero-cycle context switch to perform second operations associated with the interrupt service thread using the second set of registers.

According to another aspect of the invention, a system-on-chip (SoC) is provided. The SoC may include a memory. The SoC may also include a processor. The processor may include a plurality of registers. The plurality of registers may include a first set of registers associated with a regular mode thread. The plurality of registers may also include a second set of registers associated with an interrupt service thread. The processor may also include a processing core. The processing core may be configured to perform first operations associated with the regular mode thread. The processing core may be configured to receive an interrupt service signal associated with the interrupt service thread. In response to the interrupt service signal, the processing core may be configured to implement a zero-cycle context switch to perform second operations associated with the interrupt service thread using the second set of registers.

According to another aspect of the disclosure, a method of performing an interrupt service procedure is provided. The method may include performing, by a processor, first operations associated with a regular mode thread. The method may include maintaining, by a first set of registers of the processor, first information associated with the regular mode thread. The method may include receiving an interrupt service signal associated with an interrupt service thread. In response to the interrupt service signal, the method may include implementing a zero-cycle context switch to perform second operations associated with the interrupt service thread using a second set of registers different than the first set of registers. The first set of registers may be associated with the regular mode thread, and the second set of registers may be associated with the interrupt service thread.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

DETAILED DESCRIPTION

Figure 1:
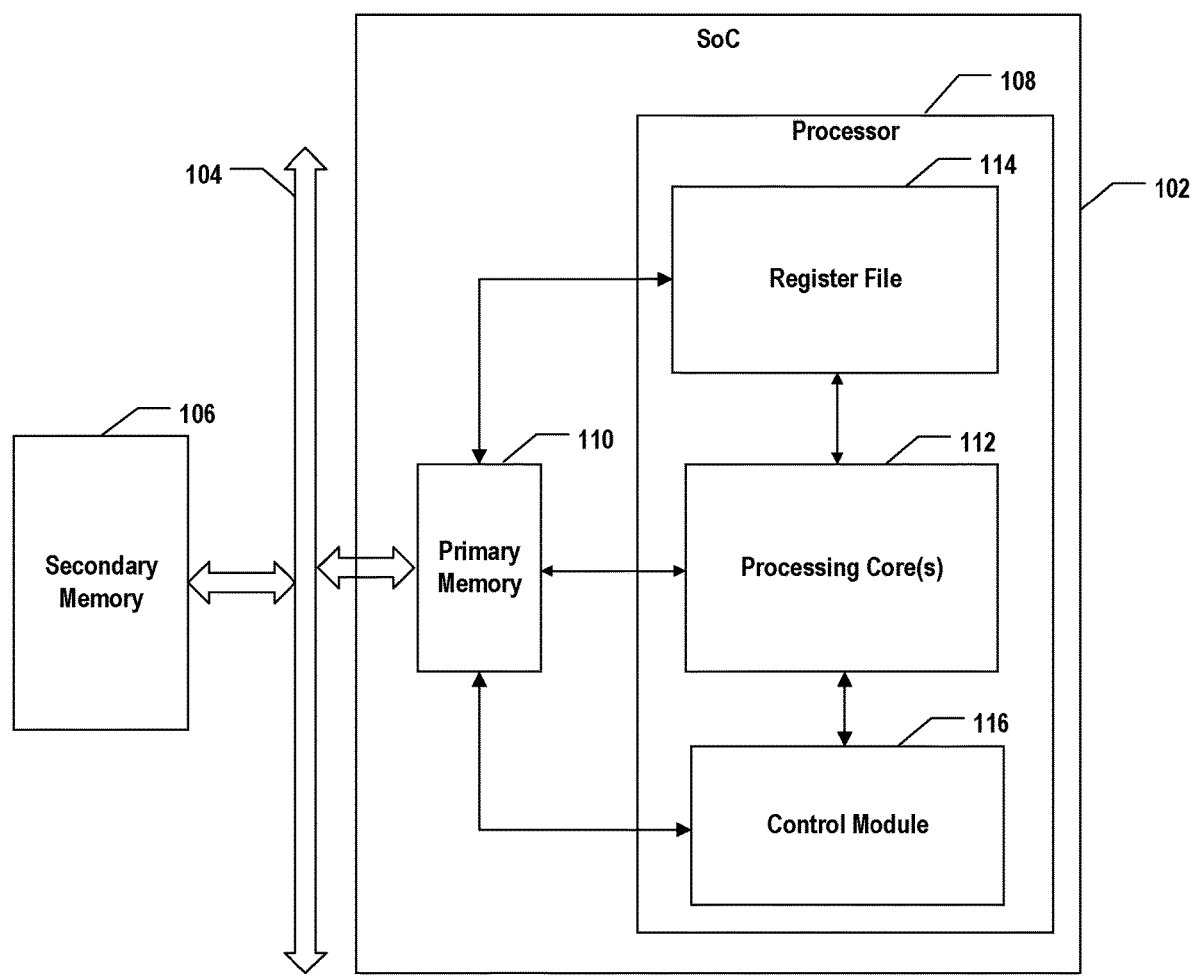
FIG. 1 illustrates a block diagram of a system-on-chip (SoC), according to certain embodiments of the present disclosure.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that one or more embodiments described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more"

as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the terms "based on," "based upon," and terms with similar meaning may be understood as not necessarily intended to convey an exclusive set of factors and may, instead, allow for existence of additional factors not necessarily expressly described, again, depending at least in part on context.

Various aspects of the present disclosure will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

As used herein, the terms "regular mode thread," "regular mode operation," "backend thread," and "backend operation" may be used interchangeably. As also used herein, the terms "interrupt service thread," "interrupt service operation," "frontend thread," and "frontend operation" may be used interchangeably. The term "zero-cycle context switch" may be defined as any context switch that can be implemented by a processor in a same clock cycle in which an interrupt service signal is received. Additionally and/or alternatively, the term "zero-cycle context switch" may be defined as any context switch in which the processor does not copy over thread data to a different register file or call stack memory before implementing an interrupt service thread.

In modern computer architectures, an interrupt is a response by the processor to an event that needs attention from the software. An interrupt service signal alerts the processor to a forthcoming interrupt service. Moreover, the interrupt service signal acts as a request for the processor to interrupt the currently executing code of a regular mode thread and to implement a context switch, so that the interrupt service can be processed in a timely manner. To implement a conventional context switch, the processor may interrupt the regular mode thread being run, save the state and information of the regular mode thread in a different register or memory external (e.g., such as call stack memory) before executing the interrupt service using the registers that were previously used for the regular mode thread. This interruption is temporary, and unless the interrupt indicates a fatal error, the processor resumes the regular mode thread after the completion of the interrupt service. To resume regular mode operations, the processor accesses the register or external memory to which the regular mode information was moved, and returns this information to the processor's internal register(s) before resuming the regular mode thread at the point in which it was paused.

When the processor includes a reduced instruction set computer (RISC)-V computer architecture, for example, for example, a general-purpose register (GPR) with thirty-two register files (X0-X31) is included in the processor for storing information associated with a running thread. Generally, the entire GPR is dedicated to performing one task at a time. In other words, the processor uses all thirty-two register files of the GPR for any given thread. Thus, when an interrupt service signal is received, the processor pauses the regular mode thread, and moves the information maintained in the GPR to another register array or to external memory. Then, the processor may implement the interrupt service thread using the thirty-two registers of the GPR. Once the interrupt service thread is complete, the processor accesses the register and/or external memory, and returns information associated with the regular mode thread back to the GPR, before resuming operations associated with the regular mode thread.

These conventional context switches are software-based and are implemented across multiple clock cycles (e.g., up to or more than 100 clock cycles). In timing-critical interrupt service scenarios, such as low latency 5G new radio (NR) services, a conventional software-based context switch may be unable to accommodate such strict timing requirements. Moreover, copying register data to a different register array (e.g., call stack memory, stack data memory, random access memory (RAM)), generating memory maps associated with the paused thread, and updating various tables and lists, as performed in conventional software-based context switches, consumes an undesirable amount of power.

Thus, there exists an unmet need for a context switch technique that can be implemented across a reduced number of clock cycles, while at the same time consuming less power, as compared to a conventional software-based context switch.

To overcome these and other challenges, the present disclosure provides a zero-cycle context switch that may be implemented by a processor in the same clock cycle in which an interrupt service signal is received. A processor of the present disclosure may implement the zero-cycle context switch by merely pausing the regular mode thread and without the need to copy regular mode information back and forth to different registers. More specifically, the zero-cycle context switch of the present disclosure may be achieved with the use of a register array that includes a first set of registers dedicated to regular mode threads (also referred to herein as "backend threads") and a second set of registers dedicated to interrupt service threads (also referred to herein as "frontend threads"). Thus, when an interrupt service signal is received, the processor merely pauses the regular mode thread, and the first set of registers enter low power mode. Then, the processor may activate the second set of registers to implement the interrupt service. Once completed, the second set of registers return to low power mode, and the first set of registers are activated once again. In so doing, the regular mode thread may be seamlessly resumed at the point at which it was paused. With the use of dedicated registers, the need to copy regular mode information and other time-consuming procedures associated with conventional context switches is eliminated. In this way, the processor of the present disclosure may implement the zero-cycle context switch in the same clock cycle in which the interrupt service signal is received.

As compared to the known software-based approach(es), the hardware-assisted zero-cycle context switch solution of the present disclosure uses a negligible amount of power and processing overhead, while at the same time providing a significant reduction in silicon footprint by eliminating additional call stack memory used during a conventional context switch. This reduction in silicon footprint provides the additional benefit of reducing manufacturing costs. Further details of the present zero-cycle context switch are provided below in connection with FIGS. 1-5.

FIG. 1 illustrates a block diagram of a system 100 having an SoC 102, according to some embodiments of the present disclosure. System 100 may include SoC 102 that includes a processor 108 and a primary memory 110, a bus 104, and a secondary memory 106. System 100 may be applied or integrated into various systems and apparatuses capable of high-speed data processing, such as computers and wireless communication devices. For example, system 100 may be part of a mobile phone, a desktop computer, a laptop computer, a tablet, a vehicle computer, a gaming console, a printer, a positioning device, a wearable electronic device, a smart sensor, a virtual reality (VR) device, an augmented reality (AR) device, or any other suitable electronic devices having high-speed data processing capability. Using a wireless communication device as an example, SoC 102 may serve as an application processor (AP) and/or a baseband processor (BP) that imports data and instructions from secondary memory 106, executing instructions to perform various mathematical and logical calculations on the data, and exporting the calculation results for further processing and transmission over cellular networks.

As shown in FIG. 1, secondary memory 106 may be located outside SoC 102 and operatively coupled to SoC 102 through bus 104. Secondary memory 106 may receive and store data of different types from various sources via communication channels (e.g., bus 104). For example, secondary memory 106 may receive and store digital imaging data captured by a camera of the wireless communication device, voice data transmitted via cellular networks, such as a phone call from another user, or text data input by the user of the system through an interactive input device, such as a touch panel, a keyboard, or the like. Secondary memory 106 may also receive and store computer instructions to be loaded to processor 108 for data processing, such as instructions associated with regular mode threads and/or interrupt service threads. Such instructions may be in the form of an instruction set, which contains discrete instructions that teach the microprocessor or other functional components of the microcontroller chip to perform one or more of the following types of operations-data handling and memory operations, arithmetic and logic operations, control flow operations, co-processor operations, etc. Secondary memory 106 may be provided as a standalone component in or attached to the apparatus, such as a hard drive, a Flash drive, a solid-state drive (SSD), or the like. Other types of memory compatible with the present disclosure may also be conceived. It is understood that secondary memory 106 may not be the only component capable of storing data and instructions. Primary memory 110 may also store data and instructions and, unlike secondary memory 106, may have direct access to processor 108. Primary memory 110 may store data and instructions associated with regular mode threads and/or interrupt service threads, for example. Secondary memory 106 may be a non-volatile memory, which can keep the stored data even though power is lost. In contrast, primary memory 110 may be volatile memory, and the data may be lost once the power is lost. Because of this difference in structure and design, each type of memory may have its own dedicated use within the system.

Data between secondary memory 106 and SoC 102 may be transmitted via bus 104. Bus 104 functions as a highway that allows data to move between various nodes, e.g., memory, microprocessor, transceiver, user interface, or other sub-components in system 100, according to some embodiments. Bus 104 can be serial or parallel. Bus 104 can also be implemented by hardware (such as electrical wires, optical fiber, etc.). It is understood that bus 104 can have sufficient bandwidth for storing and loading a large amount of data (e.g., vectors) between secondary memory 106 and primary memory 110 without delay to the data processing by processor 108.

SoC designs may integrate one or more components for computation and processing on an integrated-circuit (IC) substrate. For applications where chip size matters, such as smartphones and wearable gadgets, SoC design is an ideal design choice because of its compact area. It further has the advantage of small power consumption. In some embodiments, as shown in FIG. 1, one or more processors 108 and primary memory 110 are integrated into SoC 102. It is understood that in some examples, primary memory 110 and processor 108 may not be integrated on the same chip, but instead on separate chips.

Processor 108 may include any suitable specialized processor including, but not limited to, a CPU, a graphic processing unit (GPU), a digital processing processor (DSP), a tensor processing unit (TPU), a vision processing unit (VPU), a neural processing unit (NPU), a synergistic processing unit (SPU), a physics processing unit (PPU), and an image signal processor (ISP). Processor 108 may also include a microcontroller unit (MCU), which can handle a specific operation in an embedded system. In some embodiments in which system 100 is used in wireless communications, each MCU handles a specific operation of a mobile device, for example, communications other than cellular communication (e.g., Bluetooth communication, Wi-Fi communication, frequency modulation (FM) radio, etc.), power management, display drive, positioning and navigation, touch screen, camera, etc.

As shown in FIG. 1, processor 108 may include one or more processing cores 112 (a.k.a. "cores"), a register file 114, and a control module 116. In some embodiments, processing core 112 may include one or more functional units that perform various data operations. For example, processing core 112 may include an arithmetic logic unit (ALU) that performs arithmetic and bitwise operations on data (also known as "operand"), such as addition, subtraction, increment, decrement, AND, OR, Exclusive-OR, etc. Processing core 112 may also include a floating-point unit (FPU) that performs similar arithmetic operations but on a type of operands (e.g., floating-point numbers) different from those operated by the ALU (e.g., binary numbers). The operations may be addition, subtraction, multiplication, etc. Another way of categorizing the functional units may be based on whether the data processed by the function unit is a scalar or a vector. For example, processing cores 112 may include scalar function units (SFUs) for handling scalar operations and vector function units (VFUs) for handling vector operations. It is understood that in case that processor 108 includes multiple processing cores 112, each processing core 112 may carry data and instruction operations in serial or in parallel. This multi-core processor design can effectively enhance the processing speed of processor 108 and multiplies its performance. In some embodiments, processor 108 may be a CPU with a vector co-processor (a vector engine) that can handle both scalar operations and vector operations.

Control module 116 may be operatively coupled to primary memory 110 and processing core 112. Control module 116 may be implemented by circuits fabricated on the same semiconductor chip as processing core 112. Control module 116 may serve as a role similar to a command tower. For example, control module 116 may retrieve and decode various computer instructions from primary memory 110 to processing core 112 and instruct processing core 112 what processes to be carried out on operands loaded from primary memory 110. Computer instructions comprised of subroutines, tasks, and/or threads may be in the form of a computer instruction set. Different computer instructions may have a different impact on the performance of processor 108. For example, instructions from a RISC are generally simpler than those from a complex instruction set computer (CISC) and thus may be used to achieve fewer cycles per instruction, thereby reducing the processing time by processor 108. Examples of processes carried out by processor 108 include running a regular mode thread, running an interrupt service thread, setting a register to a fixed value, copying data from a memory location to a register, copying data between registers, adding, subtracting, multiplying, and dividing, comparing values stored on two different registers, etc. In some embodiments, control module 116 may further include an instruction decoder (not shown) that decodes the computer instructions into instructions readable by other components on processor 108, such as processing core 112. The decoded instructions may be subsequently provided to processing core 112. Control module 116 may send an interrupt service signal to processing core 112 in the event of an interrupt service.

Register file 114 may include an array of processor registers in a central processing unit (CPU), e.g., such as processor 108. In some embodiments, register file 114 may be integrated circuit based and may be implemented by way of fast static RAMs with multiple ports. Such RAMs are distinguished by having dedicated read and write ports, whereas ordinary multiport SRAMs will usually read and write through the same ports. The instruction set architecture of processor 108 usually has defined a set of registers that are used to stage data between primary memory 110 and the functional units on SoC 102. In simpler CPUs, register file 114 may include registers that correspond one-for-one to the entries in a physical register file (PRF) within the CPU. More complicated CPUs use register renaming, so that the mapping of which physical entry stores a particular architectural register changes dynamically during execution. Register file 114 is part of the architecture visible to the programmer, as opposed to the concept of transparent caches. Examples of instruction set architectures that may be used for processor 108 include, e.g., a RISC-V architecture, a CISC architecture, a very long instruction word (VLIW) architecture, a long instruction word (LIW), an explicitly parallel instruction computing (EPIC) architecture, a minimal instruction set computer (MISC) architecture, or a one instruction set computer (OISC) architecture, just to name a few. Thus, depending on the instruction set architecture of processor 108, register file 114 can take different configurations. For example, when processor 108 follows a RISC-V instruction set architecture, register file 114 may include thirty-two registers (X0-X31).

In some embodiments, register file 114 may be a general-purpose register (GPR) operatively coupled to processing core 112 and primary memory 110 and include multiple sets of registers for various purposes. Because of their architecture design and proximity to processing core 112, register file 114 allows processor 108 to access data, execute instructions, and transfer computation results faster than primary memory 110, according to some embodiments. In some embodiments, register file 114 includes a plurality of physical registers fabricated on SoC 102, such as fast static RAM having multiple transistors and multiple dedicated read and write ports for high-speed processing and simultaneous read and/or write operations, thus distinguishing from primary memory 110 and secondary memory 106 (such as a dynamic random-access memory (DRAM), a hard drive, or the like). The register size may be measured by the number of bits they can hold (e.g., 4 bits, 8 bits, 16 bits, 32 bits, 64 bits, 128 bits, 256 bits, 412 bits, etc.). In some embodiments, register file 114 serves as an intermediary memory placed between primary memory 110 and processing core 112. For example, register file 114 may hold frequently used programs or processing tools so that access time to these data can be reduced, thus increasing the processing speed of processor 108 while also reducing power consumption of SoC 102. In another example, register file 114 may store data being operated by processing core 112, such as regular mode data or interrupt service data, thus reducing delay in accessing the data from primary memory 110. This type of register is known as a data register. Another type is address registers, which may hold addresses (such as return addresses for paused/inactive subroutines) and may be used by instructions for indirect access of primary memory 110. There are also status registers that decide whether a certain instruction should be executed, such as the control and status register (CSR). In some embodiments, at least part of register file 114 is implemented by one or more physical register files (PRFs) within processor 108.

Figure 2:
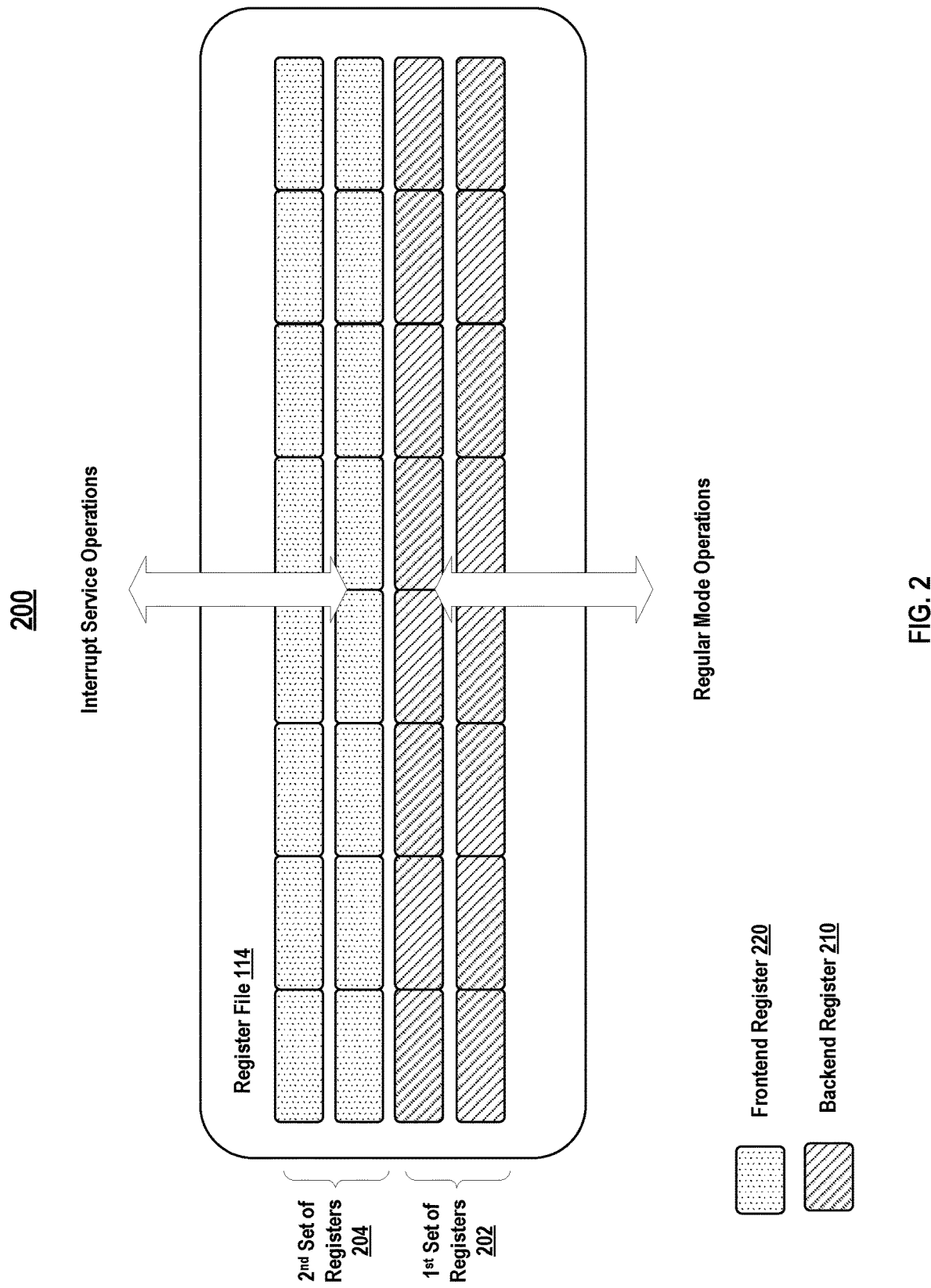
FIG. 2 illustrates a detailed block diagram of a register file of the SoC of FIG. 1 that includes a first set of registers dedicated to regular mode threads and a second set of registers dedicated to interrupt service threads, according to certain embodiments of the present disclosure.

As mentioned above, processor 108 may implement a context switch in the same clock cycle in which an interrupt service signal is received, which is referred to herein as a "zero-cycle context switch." Processor 108 may implement the zero-cycle context switch by merely pausing the regular mode thread and without the need to copy regular mode information back and forth to different registers. More specifically, the zero-cycle context switch of the present disclosure may be achieved with the use of register file 114, which includes a first set of registers dedicated to regular mode threads (also referred to herein as "backend threads") and a second set of registers dedicated to interrupt service threads (also referred to herein as "frontend threads"), as seen in FIG. 2. Thus, when an interrupt service signal is received, processor 108 merely pauses the regular mode thread, and the first set of registers enter low power mode. Then, processor 108 may activate the second set of registers to implement the interrupt service. Once completed, the second set of registers of register file 114 return to low power mode, and the first set of registers of register file 114 are activated once again. In so doing, the regular mode thread may be seamlessly resumed at the point at which it was paused. With the use of dedicated registers in register file 114, the need to copy regular mode information and other time-consuming procedures associated with conventional context switches is eliminated. In this way, processor 108 may implement the zero-cycle context switch in the same clock cycle in which the interrupt service signal is received.

As compared to the known software-based approach(es), the hardware-assisted zero-cycle context switch solution of the present disclosure uses a negligible amount of power and processing overhead, while at the same time providing a significant reduction in silicon footprint by eliminating additional call stack memory used during a conventional context switch. This reduction in silicon footprint provides the additional benefit of reducing manufacturing costs. Additional details associated with register file 114 and zero-cycle context switch are provided below in connection with FIGS. 2-3.

FIG. 2 illustrates a detailed block diagram 200 of register file 114 of FIG. 1, according to certain embodiments of the present disclosure. For illustrative purposes, register file 114 (a register array) is depicted with a RISC-V GPR architecture, which includes thirty-two registers. However, it is understood that the present zero-cycle context switch may be implemented using other register file architectures with any number of registers without departing from the scope of the present disclosure.

Referring to FIG. 2, register file 114 includes a first set of registers 202 dedicated to regular mode operations (backend operations) and a second set of registers 204 dedicated to interrupt service operations (frontend operations). In the example illustrated in FIG. 2, the first set of registers 202 include a plurality of backend registers 210, which processor 108 uses to run a regular mode thread. The second set of registers 204 include a plurality of frontend registers 220, which processor 108 uses to run an interrupt service thread.

In some embodiments, the interrupt service thread and the regular mode threads may be implemented using RISC-V embedded extension tool chain, such as embedded extension RISC-V compiler, which compiles C-code variables into registers X0-X15 (second set of registers 204) for an interrupt service thread and into registers X16-X29 (first set of registers 202) for a regular mode thread. In some embodiments, a regular mode thread may be considered a less timing critical task (backend thread), which runs within first set of registers 202, which is the backend thread. Here, an interrupt service thread may be considered a more timing-critical task (frontend thread), which runs within second set of registers 204. Due to the timing critical nature of an interrupt service thread, the regular mode thread running on first set of registers 202 may be preempted when an interrupt service signal is received. In this scenario, processor 108 pauses the regular mode thread such that backend thread information is maintained within first set of registers 202 without copying the backend thread information over to call stack memory and/or external memory/register file. Then, processor 108 places first set of registers 202 in low power mode, actives second set of registers 204, and begins the interrupt service thread.

Once completed, processor 108 places second set of registers 204 back in low power mode, and the first set of registers 202 are activated once again. In so doing, the regular mode thread may be seamlessly resumed at the point at which it was paused. With the use of dedicated registers, such as first set of registers 202 and second set of registers 204, the need to copy regular mode information and perform other time-consuming procedures associated with conventional context switches is eliminated. In this way, processor 108 may implement the zero-cycle context switch in the same clock cycle in which the interrupt service signal is received.

As compared to the known software-based approach(es), the hardware-assisted zero-cycle context switch solution of the present disclosure uses a negligible amount of power and processing overhead, while at the same time providing a significant reduction in silicon footprint by eliminating additional call stack memory used during a conventional context switch. This reduction in silicon footprint provides the additional benefit of reducing manufacturing costs.

Besides, while in debug mode, both first set of registers 202 and second set of registers 204 may be used by a single debug thread. This is because in debug mode, the number of cycles across which a context switch is implemented is of little to no consequence, and a user can debug the entire SoC 102, processor 108, and/or processing core 112 seamlessly.

Figure 3:
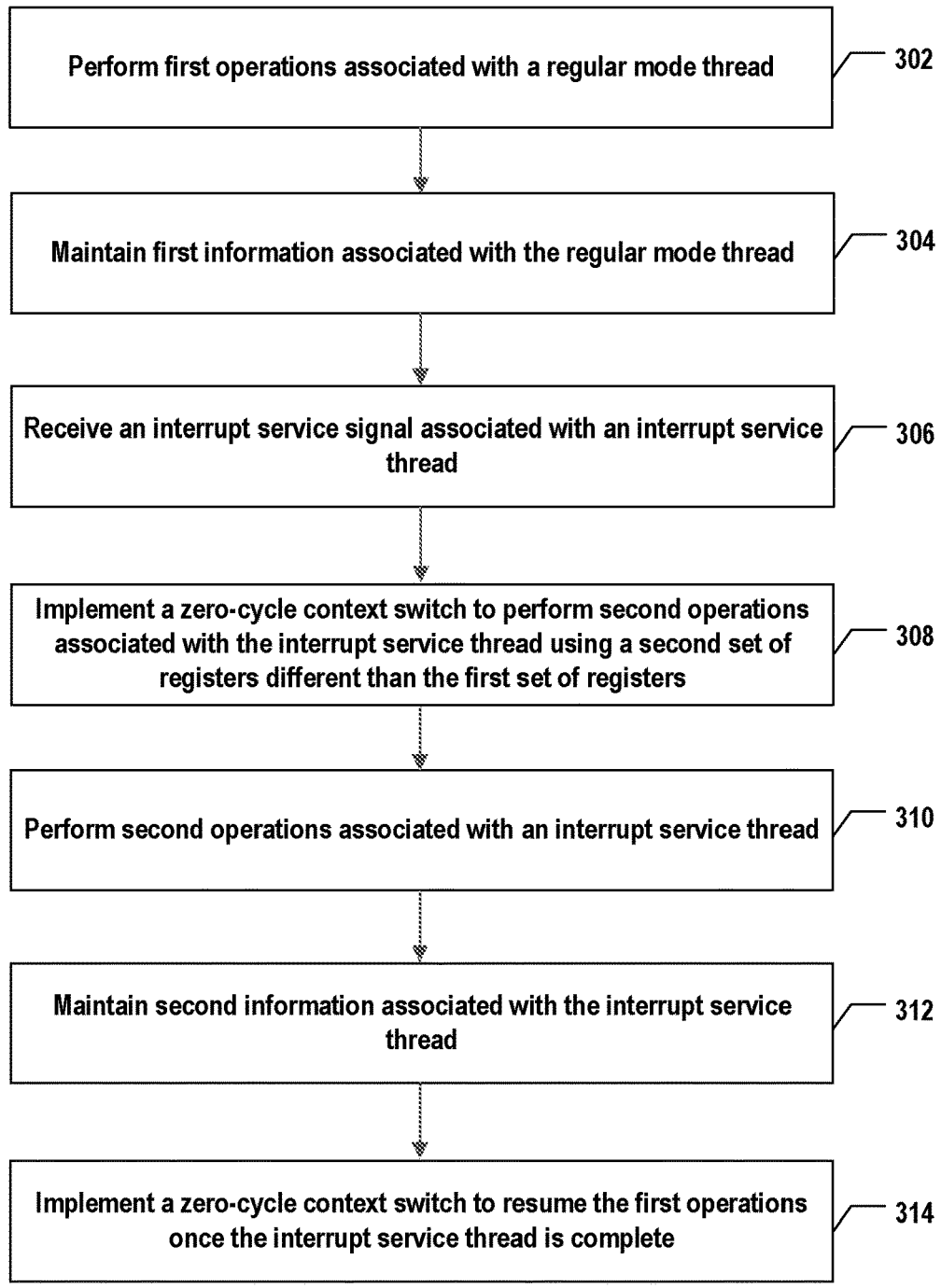
FIG. 3 illustrates a method for implementing a zero-cycle context switch, according to certain embodiments of the present disclosure.

FIG. 3 illustrates a flowchart of a method 300 of implementing a zero-cycle context switch, according to embodiments of the disclosure. Method 300 may be performed by an apparatus, e.g., system 100, SoC 102, processor 108, processing core(s) 112, register file 114, first set of registers 202, and/or second set of registers 204. Method 300 may include steps 302-314 as described below. It is to be appreciated that some of the steps may be optional, and some of the steps may be performed simultaneously, or in a different order than shown in FIG. 3.

At 302, the apparatus may perform first operations associated with a regular mode thread. For example, referring to FIGS. 1 and 2, processor 108 may perform operations associated with a regular mode thread using first set of registers 202 of register file 114.

At 304, the apparatus may maintain first information associated with the regular mode thread. For example, referring to FIGS. 1 and 2, processor 108 may maintain information associated with the regular mode thread using first set of registers 202, which are dedicated for backend operations.

At 306, the apparatus may receive an interrupt service signal associated with an interrupt service thread. For example, referring to FIGS. 1 and 2, processing core 112 may receive an interrupt service signal from control module 116, for example. The interrupt service signal may be associated with a timing-critical interrupt service thread.

At 308, in response to the interrupt service signal, the apparatus may implement a zero-cycle context switch to perform second operations associated with the interrupt service thread using a second set of registers different than the first set of registers. In some embodiments, the apparatus may implement the zero-cycle context switch by pausing the first operations associated with the regular mode thread. In some embodiments, the apparatus may implement the zero-cycle context switch by maintaining, by the first set of registers, first information associated with the regular mode thread without copying the first information to a call stack memory and/or different memory/register file. For example, referring to FIGS. 1 and 2, processor 108 may implement a context switch in the same clock cycle in which an interrupt service signal is received, which is referred to herein as a "zero-cycle context switch." Processor 108 may implement the zero-cycle context switch by merely pausing the regular mode thread and without the need to copy regular mode information back and forth to different registers. More specifically, the zero-cycle context switch of the present disclosure may be achieved with the use of register file 114, which includes a first set of registers dedicated to regular mode threads (also referred to herein as "backend threads") and a second set of registers dedicated to interrupt service threads (also referred to herein as "frontend threads"), as seen in FIG. 2. Thus, when an interrupt service signal is received, processor 108 merely pauses the regular mode thread, and the first set of registers enter low power mode. Then, processor 108 may activate the second set of registers to implement the interrupt service.

At 310, the apparatus may perform second operations associated with an interrupt service thread. For example, referring to FIGS. 1 and 2, once second set of registers 204 is activated, processor 108 may perform frontend operations associated with the interrupt service thread.

At 312, the apparatus may maintain second information associated with the interrupt service thread using a second set of registers. For example, referring to FIGS. 1 and 2, processor 108 may use second set of registers 204 to maintain frontend information associated with the interrupt service thread.

At 314, in response to a completion of the interrupt service thread, the apparatus may implement the zero-cycle context switch to resume the first operations associated with the regular mode thread based on the first information maintained in the first set of registers. For example, referring to FIGS. 1 and 2, once completed, processor 108 places second set of registers 204 back in low power mode, and the first set of registers 202 are activated once again. In so doing, the regular mode thread may be seamlessly resumed at the point at which it was paused. With the use of dedicated registers, such as first set of registers 202 and second set of registers 204, the need to copy regular mode information and other time-consuming procedures associated with conventional context switches is eliminated. In this way, processor 108 may implement the zero-cycle context switch in the same clock cycle in which the interrupt service signal is received.

The hardware and software data processing technology disclosed herein, such as system 100 in FIG. 1 and method 300 in FIG. 3, may be implemented by any suitable computing device such as, e.g., a personal computer (PC), a laptop computer, a digital signal processor, a tablet device, a digital camera, a merchant terminal, a vehicle, or any suitable nodes in a wireless network, just to name a few. For example, FIG. 4 illustrates a wireless network 400, in which certain aspects of the present disclosure may be implemented, according to some embodiments of the present disclosure.

Figure 4:
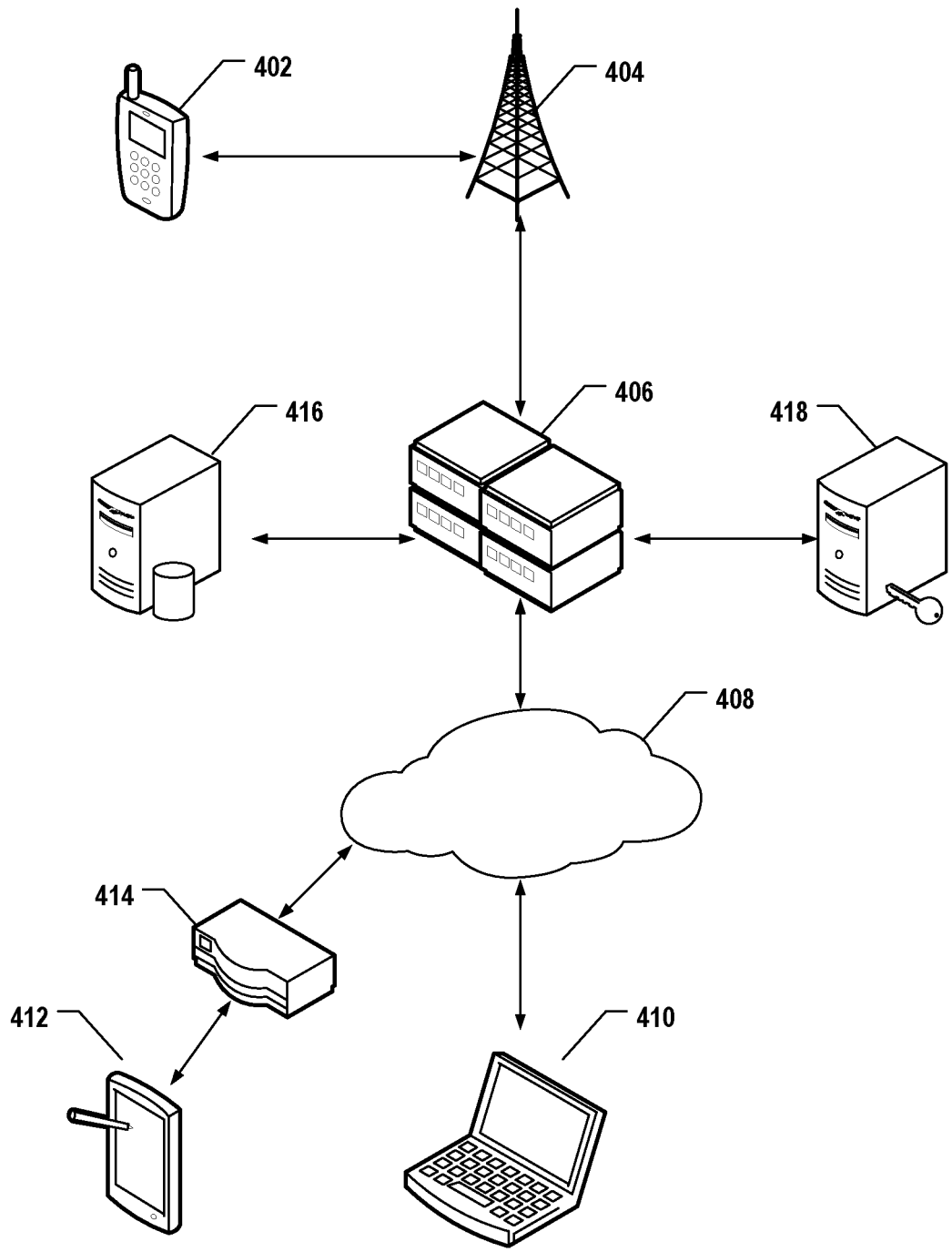
FIG. 4 illustrates a block diagram of a node, according to certain embodiments of the present disclosure.

As shown in FIG. 4, wireless network 400 may include a network of nodes, such as a user equipment (UE) 402, an access node 404, and a core network element 406. User equipment 402 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 402 is illustrated as a mobile phone simply by way of illustration and not by way of limitation.

Access node 404 may be a device that communicates with user equipment 402, such as a wireless access point, a base station (BS), a Node B, an enhanced Node B (eNodeB or eNB), a next-generation NodeB (gNodeB or gNB), a cluster master node, or the like. Access node 404 may have a wired connection to user equipment 402, a wireless connection to user equipment 402, or any combination thereof. Access node 404 may be connected to user equipment 402 by multiple connections, and user equipment 402 may be connected to other access nodes in addition to access node 404. Access node 404 may also be connected to other UEs. It is understood that access node 404 is illustrated by a radio tower by way of illustration and not by way of limitation.

Core network element 406 may serve access node 404 and user equipment 402 to provide core network services. Examples of core network element 406 may include a home subscriber server (HSS), a mobility management entity (MME), a serving gateway (SGW), or a packet data network gateway (PGW). These are examples of core network elements of an evolved packet core (EPC) system, which is a core network for the Long-Term Evolution (LTE) system. Other core network elements may be used in LTE and in other communication systems. In some embodiments, core network element 406 includes an access and mobility management function (AMF) device, a session management function (SMF) device, or a user plane function (UPF) device, of a core network for the NR system. It is understood that core network element 406 is shown as a set of rack-mounted servers by way of illustration and not by way of limitation.

Core network element 406 may connect with a large network, such as the Internet 408, or another internet protocol (IP) network, to communicate packet data over any distance. In this way, data from user equipment 402 may be communicated to other UEs connected to other access points, including, for example, a computer 410 connected to Internet 408, for example, using a wired connection or a wireless connection, or to a tablet 412 wirelessly connected to Internet 408 via a router 414. Thus, computer 410 and tablet 412 provide additional examples of possible UEs, and router 414 provides an example of another possible access node.

A generic example of a rack-mounted server is provided as an illustration of core network element 406. However, there may be multiple elements in the core network including database servers, such as a database 416, and security and authentication servers, such as an authentication server 418. Database 416 may, for example, manage data related to user subscription to network services. A home location register (HLR) is an example of a standardized database of subscriber information for a cellular network. Likewise, authentication server 418 may handle authentication of users, sessions, and so on. In the NR system, an authentication server function (AUSF) device may be the specific entity to perform user equipment authentication. In some embodiments, a single server rack may handle multiple such functions, such that the connections between core network element 406, authentication server 418, and database 416, may be local connections within a single rack.

Figure 5:
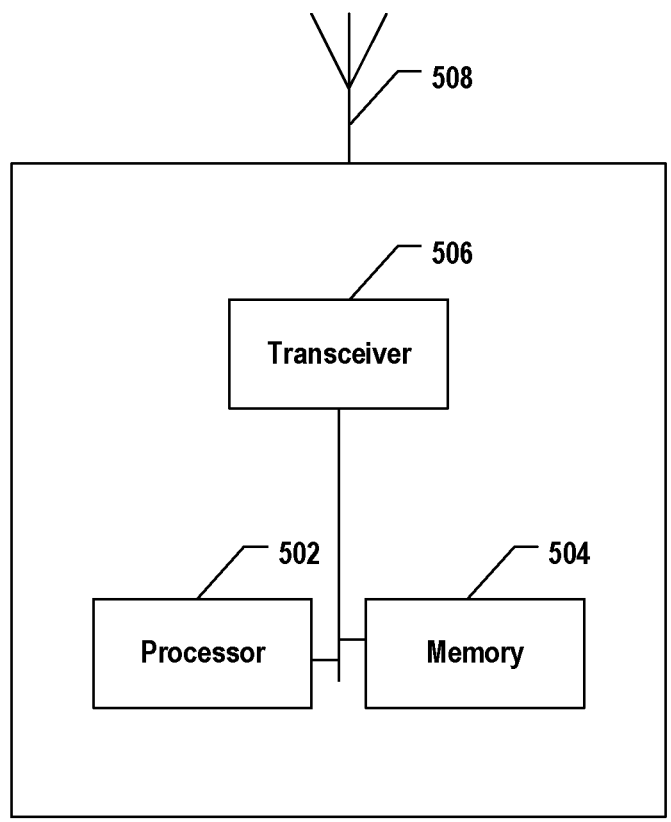
FIG. 5 illustrates a wireless network, according to certain embodiments of the present disclosure.

Each element in FIG. 4 may be considered a node of wireless network 400. More detail regarding the possible implementation of a node is provided by way of example in the description of a node 500 in FIG. 5. Node 500 may be configured as user equipment 402, access node 404, or core network element 406 in FIG. 1. Similarly, node 500 may also be configured as computer 410, router 414, tablet 412, database 416, or authentication server 418 in FIG. 4. As shown in FIG. 5, node 500 may include a processor 502, a memory 504, and a transceiver 506. These components are shown as connected to one another by a bus, but other connection types are also permitted. When node 500 is user equipment 402, additional components may also be included, such as a user interface (UI), sensors, and the like. Similarly, node 500 may be implemented as a blade in a server system when node 500 is configured as core network element 406. Other implementations are also possible.

Transceiver 506 may include any suitable device for sending and/or receiving data. Node 500 may include one or more transceivers, although only one transceiver 506 is shown for simplicity of illustration. An antenna 508 is shown as a possible communication mechanism for node 500. Multiple antennas and/or arrays of antennas may be utilized for receiving multiple spatially multiplex data streams. Additionally, examples of node 500 may communicate using wired techniques rather than (or in addition to) wireless techniques. For example, access node 404 may communicate wirelessly to user equipment 402 and may communicate by a wired connection (for example, by optical or coaxial cable) to core network element 406. Other communication hardware, such as a network interface card (NIC), may be included as well.

As shown in FIG. 5, node 500 may include processor 502. Although only one processor is shown, it is understood that multiple processors can be included. Processor 502 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 502 may be a hardware device having one or more processing cores. Processor 502 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 5, node 500 may also include memory 504. Although only one memory is shown, it is understood that multiple memories can be included. Memory 504 can broadly include both memory and storage. For example, memory 504 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 502. Broadly, memory 504 may be embodied by any computer-readable medium, such as a non-transitory computer-readable medium.

Processor 502, memory 504, and transceiver 506 may be implemented in various forms in node 500 for performing wireless communication functions. In some embodiments, processor 502, memory 504, and transceiver 506 of node 500 are implemented (e.g., integrated) on one or more system-on-chips (SoCs). In one example, processor 502 and memory 504 may be integrated on an application processor (AP) SoC (sometimes known as a "host," referred to herein as a "host chip") that handles application processing in an operating system (OS) environment, including generating raw data to be transmitted. In another example, processor 502 and memory 504 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 502 and transceiver 506 (and memory 504 in some cases) may be integrated on a radio frequency (RF) SoC (sometimes known as a "transceiver," referred to herein as an "RF chip") that transmits and receives RF signals with antenna 508. It is understood that in some examples, some or all of the host chip, baseband chip, and RF chip may be integrated as a single SoC. In particular, processor 502 may be implemented as system 100 as described above to provide low latency, high precision stack overflow prevention.

According to one aspect of the present disclosure, a processor is disclosed. The processor may include a plurality of registers. The plurality of registers may include a first set of registers associated with a regular mode thread. The plurality of registers may also include a second set of registers associated with an interrupt service thread. The processor may also include a processing core. The processing core may be configured to perform first operations associated with the regular mode thread. The processing core may be configured to receive an interrupt service signal associated with the interrupt service thread. In response to the interrupt service signal, the processing core may be configured to implement a zero-cycle context switch to perform second operations associated with the interrupt service thread using the second set of registers.

In some embodiments, the processing core may be configured to implement the zero-cycle context switch by pausing the first operations associated with the regular mode thread. In some embodiments, the processing core may be configured to implement the zero-cycle context switch by maintaining first information associated with the first operations using the first set of registers. In some embodiments, the processing core may be configured to implement the zero-cycle context switch by performing second operations associated with the interrupt service thread. In some embodiments, the processing core may be configured to implement the zero-cycle context switch by maintaining, using the second set of registers, second information associated with the interrupt service thread.

In some embodiments, in response to a completion of the interrupt service thread, the processing core may be configured to implement the zero-cycle context switch to resume the first operations associated with the regular mode thread based on the first information maintained by the first set of registers.

In some embodiments, the first set of registers are dedicated to the regular mode thread.

In some embodiments, the second set of registers are dedicated to the interrupt service thread.

In some embodiments, the zero-cycle context switch includes a hardware-based context switch.

In some embodiments, the zero-cycle context switch is implemented without a software-based context switch.

In some embodiments, the plurality of registers includes a GPR file.

According to another aspect of the invention, an SoC is provided. The SoC may include a memory. The SoC may also include a processor. The processor may include a plurality of registers. The plurality of registers may include a first set of registers associated with a regular mode thread. The plurality of registers may also include a second set of registers associated with an interrupt service thread. The processor may also include a processing core. The processing core may be configured to perform first operations associated with the regular mode thread. The processing core may be configured to receive an interrupt service signal associated with the interrupt service thread. In response to the interrupt service signal, the processing core may be configured to implement a zero-cycle context switch to perform second operations associated with the interrupt service thread using the second set of registers.

In some embodiments, the processing core may be configured to implement the zero-cycle context switch by pausing the first operations associated with the regular mode thread. In some embodiments, the processing core may be configured to implement the zero-cycle context switch by maintaining first information associated with the first operations using the first set of registers. In some embodiments, the processing core may be configured to implement the zero-cycle context switch by performing second operations associated with the interrupt service thread. In some embodiments, the processing core may be configured to implement the zero-cycle context switch by maintaining, using the second set of registers, second information associated with the interrupt service thread.

In some embodiments, in response to a completion of the interrupt service thread, the processing core may be configured to implement the zero-cycle context switch to resume the first operations associated with the regular mode thread based on the first information maintained by the first set of registers.

In some embodiments, the first set of registers are dedicated to the regular mode thread.

In some embodiments, the second set of registers are dedicated to the interrupt service thread.

In some embodiments, the zero-cycle context switch includes a hardware-based context switch.

In some embodiments, the zero-cycle context switch is implemented without a software-based context switch.

In some embodiments, the plurality of registers includes a GPR file.

According to another aspect of the disclosure, a method of performing an interrupt service procedure is provided. The method may include performing, by a processor, first operations associated with a regular mode thread. The method may include maintaining, by a first set of registers of the processor, first information associated with the regular mode thread. The method may include receiving, by the processor, an interrupt service signal associated with an interrupt service thread. In response to the interrupt service signal, the method may include implementing, by the processor, a zero-cycle context switch to perform second operations associated with the interrupt service thread using a second set of registers different than the first set of registers. The first set of registers may be associated with the regular mode thread, and the second set of registers may be associated with the interrupt service thread.

In some embodiments, the implementing the zero-cycle context switch may include pausing, by the processor, the first operations associated with the regular mode thread. In some embodiments, the implementing the zero-cycle context switch may include performing, by the processor, second operations associated with the interrupt service thread. In some embodiments, the implementing the zero-cycle context switch may include maintaining, by the second set of registers of the processor, second information associated with the interrupt service thread. In response to a completion of the interrupt service thread, the implementing the zero-cycle context switch may include implementing the zero-cycle context switch to resume the first operations associated with the regular mode thread based on the first information maintained in the first set of registers.

In some embodiments, the first set of registers may be dedicated to the regular mode thread. In some embodiments, the second set of registers may be dedicated to the interrupt service thread.

In some embodiments, the zero-cycle context switch may be implemented without a software-based context switch.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described embodiments, but should be defined only in accordance with the following claims and their equivalents.

What is claimed is:

1. A processor, comprising:
 a plurality of registers comprising:
  a first set of registers associated with a regular mode thread; and
  a second set of registers associated with an interrupt service thread,
 a processing core configured to:
  perform first operations associated with the regular mode thread;
  receive an interrupt service signal associated with the interrupt service thread; and
  in response to the interrupt service signal, implement a zero-cycle context switch to perform second operations associated with the interrupt service thread using the second set of registers,
 wherein the processing core is configured to implement the zero-cycle context switch by:
 pausing the first operations associated with the regular mode thread; and
 maintaining first information associated with the first operations using the first set of registers, and wherein
 in response to a completion of the interrupt service thread, the processing core is configured to implement the zero-cycle context switch to resume the first operations associated with the regular mode thread based on the first information maintained by the first set of registers.

2. The processor of claim 1, wherein the processing core is further configured to implement the zero-cycle context switch by:
 performing second operations associated with the interrupt service thread; and
 maintaining, using the second set of registers, second information associated with the interrupt service thread.

3. The processor of claim 1, wherein the first set of registers are dedicated to the regular mode thread.

4. The processor of claim 1, wherein the second set of registers are dedicated to the interrupt service thread.

5. The processor of claim 1, wherein the zero-cycle context switch includes a hardware-based context switch.

6. The processor of claim 1, wherein the zero-cycle context switch is implemented without a software-based context switch.

7. The processor of claim 1, wherein the plurality of registers includes a general-purpose register (GPR) file.

8. A system-on-chip (SoC), comprising:
a memory; and
a processor comprising:
a plurality of registers comprising:
a first set of registers associated with a regular mode thread; and
a second set of registers associated with an interrupt service thread,
a processing core configured to:
perform first operations associated with the regular mode thread;
receive an interrupt service signal associated with the interrupt service thread; and
in response to the interrupt service signal, implement a zero-cycle context switch to perform second operations associated with the interrupt service thread using the second set of registers,
wherein the processing core is configured to implement the zero-cycle context switch by:
pausing the first operations associated with the regular mode thread; and
maintaining first information associated with the first operations using the first set of registers, and wherein
in response to a completion of the interrupt service thread, the processing core is configured to implement the zero-cycle context switch to resume the first operations associated with the regular mode thread based on the first information maintained by the first set of registers.

9. The SoC of claim 8, wherein the processing core is further configured to implement the zero-cycle context switch by:
performing second operations associated with the interrupt service thread; and
maintaining, using the second set of registers, second information associated with the interrupt service thread.

10. The SoC of claim 8, wherein the first set of registers are dedicated to the regular mode thread.

11. The SoC of claim 10, wherein the second set of registers are dedicated to the interrupt service thread.

12. The SoC of claim 8, wherein the zero-cycle context switch includes a hardware-based context switch.

13. The SoC of claim 8, wherein the zero-cycle context switch is implemented without a software-based context switch.

14. The SoC of claim 8, wherein the plurality of registers includes a general-purpose register (GPR) file.

15. A method of performing an interrupt service procedure, comprising:
performing, by a processor, first operations associated with a regular mode thread;
maintaining, by a first set of registers of the processor, first information associated with the regular mode thread;
receiving, by the processor, an interrupt service signal associated with an interrupt service thread; and
in response to the interrupt service signal, implementing, by the processor, a zero-cycle context switch to perform second operations associated with the interrupt service thread using a second set of registers different than the first set of registers,
wherein the first set of registers is associated with the regular mode thread, and the second set of registers is associated with the interrupt service thread, and
wherein the implementing the zero-cycle context switch comprises:
pausing, by the processor, the first operations associated with the regular mode thread; and
maintaining, by the first set of registers of the processor, first information associated with the regular mode thread, and
wherein the implementing the zero-cycle context switch further comprises:
in response to a completion of the interrupt service thread, implementing, by the processor, the zero-cycle context switch to resume the first operations associated with the regular mode thread based on the first information maintained in the first set of registers.

16. The method of claim 15, wherein the implementing the zero-cycle context switch further comprises:
performing, by the processor, second operations associated with the interrupt service thread;
maintaining, by the second set of registers of the processor, second information associated with the interrupt service thread.

17. The method of claim 15, wherein:
the first set of registers are dedicated to the regular mode thread, and
the second set of registers are dedicated to the interrupt service thread.

* * * * *